(12) United States Patent
Kalman et al.

(10) Patent No.: US 8,909,992 B2
(45) Date of Patent: Dec. 9, 2014

(54) DYNAMIC CONCOLIC EXECUTION OF AN APPLICATION

(71) Applicant: International Business Machines Corporation, Armonk, NY (US)

(72) Inventors: Daniel Kalman, Tel-Aviv (IL); Adi Sharabani, Ramat Gan (IL); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 13/686,129

(22) Filed: Nov. 27, 2012

(65) Prior Publication Data

US 2014/0149797 A1    May 29, 2014

(51) Int. Cl.
*G06F 11/00*     (2006.01)
*G06F 11/36*     (2006.01)

(52) U.S. Cl.
CPC ........ *G06F 11/3612* (2013.01); *G06F 11/3668* (2013.01)
USPC ........................................ 714/38.1; 714/47.1

(58) Field of Classification Search
CPC .................................................. G06F 11/3668
USPC ........... 714/38.1, 37, 47.1; 717/124, 125, 126
See application file for complete search history.

(56) References Cited

U.S. PATENT DOCUMENTS

| 7,584,455 B2 | 9/2009 | Ball | |
| 8,387,021 B2 * | 2/2013 | Vanoverberghe et al. | 717/126 |
| 2004/0068720 A1 * | 4/2004 | Hundt | 717/158 |
| 2004/0221268 A1 * | 11/2004 | Nichols et al. | 717/124 |
| 2008/0082968 A1 | 4/2008 | Chang et al. | |
| 2009/0125976 A1 | 5/2009 | Wassermann et al. | |
| 2010/0223599 A1 | 9/2010 | Ghosh et al. | |
| 2010/0242029 A1 | 9/2010 | Tkachuk et al. | |
| 2011/0016457 A1 | 1/2011 | Artzi et al. | |
| 2012/0179935 A1 * | 7/2012 | Wang et al. | 714/32 |
| 2012/0216077 A1 * | 8/2012 | Christensen et al. | 714/38.1 |
| 2013/0283101 A1 * | 10/2013 | Yang et al. | 714/37 |

OTHER PUBLICATIONS

Majumdar, R. et al., "Hybrid Concolic Testing," 29th Int'l Conf. on Software Engineering ICSE, May 26-27, 2007, 10 pgs.
Inkumsah, K et al., "Evacon: A Framework for Integrating Evolutionary and Concolic Testing for Object-Oriented Programs," Proc. of the 22nd IEEE/ACM Int'l. Conf. on Automated Software Engineering, 2007, 4 pgs.
Kicillof, N. et al., "Achieving Both Model and Code Coverage with Automated Gray-Box Testing," Proc. of 3rd Int'l. Workshop on Advances in Model-Based Testing, Jul. 9-12, 2007, 11 pgs.

\* cited by examiner

*Primary Examiner* — Dieu-Minh Le
(74) *Attorney, Agent, or Firm* — Cuenot, Forsythe & Kim, LLC

(57) ABSTRACT

Dynamic concolic execution of an application. A first hypotheses pertaining to a nature of test payloads that satisfy a specified property, and that are expected to satisfy a condition tested by the application's program code, can be generated. A plurality of first test payloads to test first hypothesis can be synthesized and submitted to the application during respective executions of the application. Whether each of the first test payloads actually satisfy the condition tested by the application's program code can be determined. When at least one of the first test payloads does not actually satisfy the condition tested by the application's program code, a second hypotheses that is expected to satisfy the condition tested by the application's program code can be generated. A plurality of second test payloads to test the second hypothesis can be synthesized and submitted to the application during respective executions of the application.

16 Claims, 3 Drawing Sheets

DYNAMIC CONCOLIC EXECUTION OF AN APPLICATION

BACKGROUND

Obtaining satisfactory coverage of modern, industry-scale software during testing is a highly challenging. For this, a testing agent typically is used to synthesize payloads that traverse possible execution paths identified in a static analysis. One way of accomplishing this is known as concolic execution. Concolic execution is a hybrid software verification technique that interleaves concrete execution (testing on particular inputs) with symbolic execution, a classical technique that treats program variables as symbolic variables. Symbolic execution is used in conjunction with an automated theorem prover or constraint solver based on constraint logic programming to generate new concrete inputs (test cases) with the aim of maximizing code coverage. With concolic execution, for example, a subject application can be instrumented so that that branching decisions made during the processing of a payload become visible to a testing component. In illustration, if there is a point during the application's run where the comparison "name !='John'" is performed, where "name" is a user-provided parameter, and the execution branches into the true branch of this test, then a next payload can set name to "John" to explore another execution path (e.g., where the false branch is followed). In this regard, the main focus of concolic execution is finding bugs in real-world software, rather than demonstrating program correctness.

BRIEF SUMMARY

One or more embodiments disclosed within this specification relate to dynamic concolic execution of an application.

An embodiment can include a system that includes a processor programmed to initiate executable operations. The executable operations can include generating a first hypotheses pertaining to a nature of test payloads that satisfy a specified property and that are expected to satisfy a condition tested by the application's program code, and synthesizing a plurality of first test payloads to test the first hypothesis. The executable operations also can include submitting the plurality of first test payloads to the application during respective executions of the application, and during each execution of the application with at least one of the respective first test payloads, associating the respective first test payload with respective portions of the program code exercised during the execution of the application. The executable operations further include determining whether each of the first test payloads actually satisfy the condition tested by the application's program code. When at least one of the first test payloads does not actually satisfy the condition tested by the application's program code, a second hypotheses that is expected to satisfy the condition tested by the application's program code can be generated. Further, a plurality of second test payloads to test the second hypothesis can be synthesized. The plurality of second test payloads can be submitted to the application during respective executions of the application. During each execution of the application with at least one of the respective second test payloads, the respective second test payload can be associated with respective portions of the program code exercised during the execution of the application.

Another embodiment can include a computer program product for dynamic concolic execution of an application, the computer program product including a computer readable storage medium having program code stored thereon, the program code executable by a processor to perform a method. The method can include generating, via the processor, a first hypotheses pertaining to a nature of test payloads that satisfy a specified property and that are expected to satisfy a condition tested by the application's program code, and synthesizing, by the processor, a plurality of first test payloads to test the first hypothesis. The method also can include submitting, via the processor, the plurality of first test payloads to the application during respective executions of the application, and during each execution of the application with at least one of the respective first test payloads, via the processor, associating the respective first test payload with respective portions of the program code exercised during the execution of the application. The method further can include determining, via the processor, whether each of the first test payloads actually satisfy the condition tested by the application's program code. When at least one of the first test payloads does not actually satisfy the condition tested by the application's program code, a second hypotheses that is expected to satisfy the condition tested by the application's program code can be generated via the processor. Further, a plurality of second test payloads to test the second hypothesis can be synthesized via the processor. The plurality of second test payloads can be submitted, via the processor, to the application during respective executions of the application. During each execution of the application with at least one of the respective second test payloads, the respective second test payload can be associated with respective portions of the program code exercised during the execution of the application.

DETAILED DESCRIPTION

Figure 1:
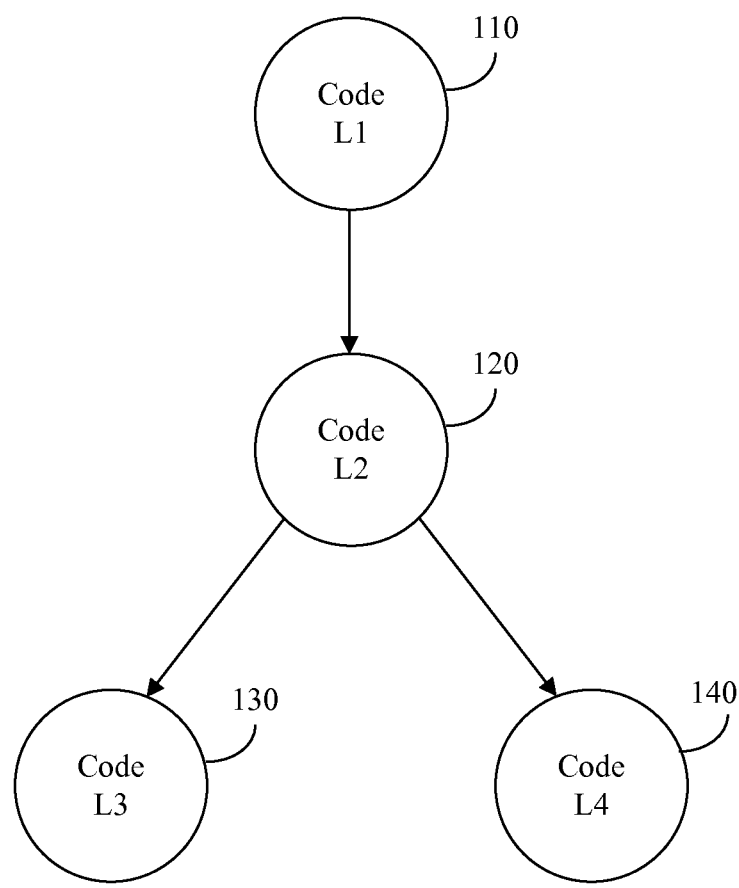
FIG. 1 depicts a static representation of an example interprocedural control-flow graph in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The term computer-readable storage medium means to a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein enable high coverage of real-world applications, and inputs that exercise all relevant branches of the program code during testing. Rather than directly analyzing the program code, the present arrangements identify how the program code partitions various test payloads flowing through the application and, based on these identifications, builds additional descriptions of tests as classifiers. These classifiers are used to hypothesize test constraints, and synthesize additional test payloads that satisfy these constraints in order test the hypothesis. The additional test payloads are input into the application during continued testing. In other words, as testing continues, history of the analysis performed thus far during testing is considered and used to synthesize additional test payloads to guide further testing. The data-centric perspective of this approach is suited to handling real-world scenarios where the application consults external resources, such as databases, as part of the evaluation of the test conditions.

FIG. 1 depicts a static representation of an example interprocedural control-flow graph (ICFG) 100 in accordance with one embodiment disclosed within this specification. The ICFG 100 can be generated by performing a static analysis of an application under test. The ICFG 100 can include a plurality of nodes 110, 120, 130, 140 representing respective portions of the application's program code. The code can include straight-line code and test code. As used herein, the term "straight-line code" means a function, routine or module in which instructions are executed sequentially, without branching, looping or testing. As used herein, the term "test code" means code that tests a variable to determine whether the variable satisfies one or more conditions.

In this example, the portion of program code L1 represented by the node 110 is straight-line code. The portion of program code L2 represented by the node 120 is test code. The code L3, L4 can be straight-line code, test code, sinks that consume data represented by variables, etc. Hereinafter, a portion of program code may be referred to simply as "code."

In the present example, it can be assumed that the code L1 will pass variables to the code L2. For example, the code L1 can be a source that receives user inputs and passes the user inputs to the code L2, which can test data represented by the variable to determine whether the variable should be passed to the code L3 or the code L4. In this regard, the data can be considered to be argument values. If the variable is passed to the code L3, the code L3 can process the variable in accordance with program instructions contained in the code L3. If the variable is passed to the code L4, the code L4 can process the variable in accordance with program instructions contained in the code L4.

The application under test can be instrumented with instrument code by a security application (or another suitable application) configured to perform testing on the application under test. The instrument code can be configured to identify code milestones executed within the application under test. For instance, the portions of code L1-L4 can be instrumented with instrument code that identifies when such portions L1-L4 receive variables, and output corresponding data, for example data to be recorded in a data table, as will be described.

Figure 2:
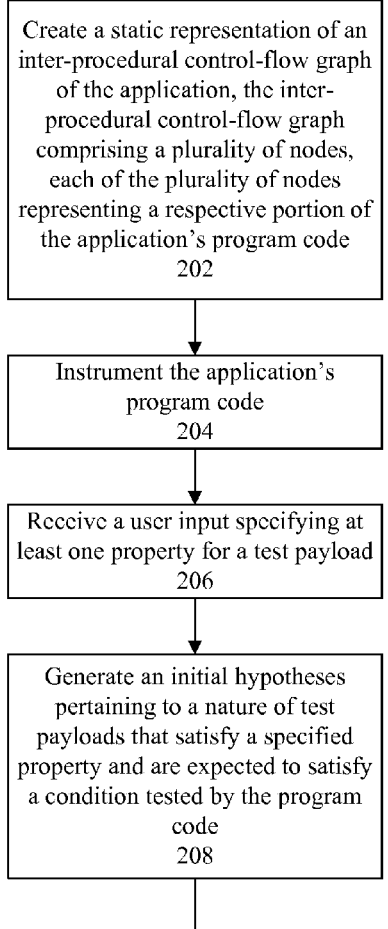
FIG. 2 is a flowchart illustrating a method of dynamic concolic execution of an application in accordance with another embodiment disclosed within this specification.
Figure 2:
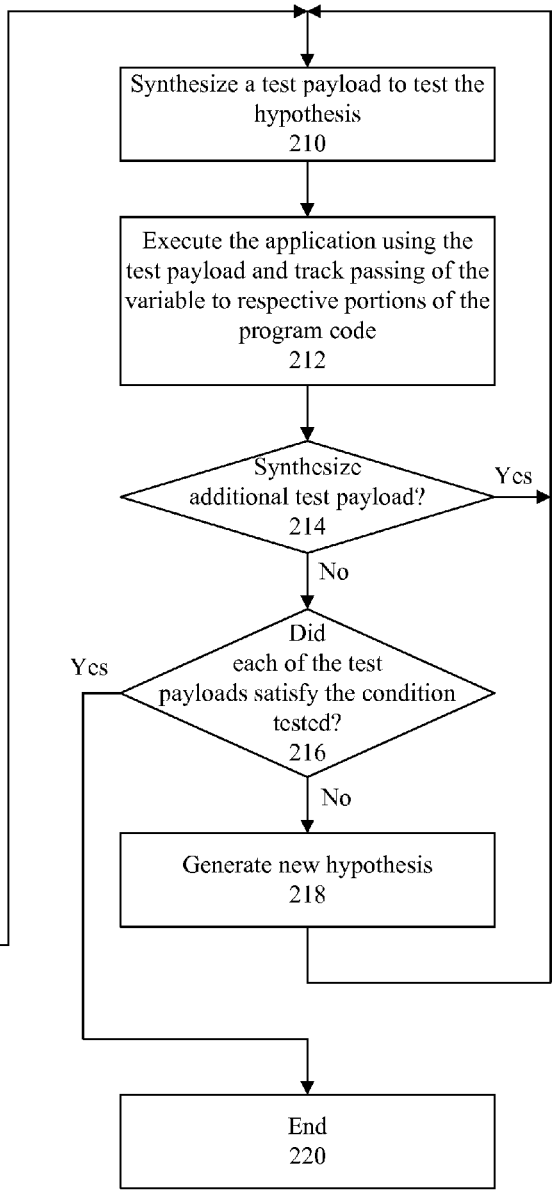

FIG. 2 is a flowchart illustrating a method 200 of dynamic concolic execution of an application in accordance with another embodiment disclosed within this specification. In the following description, reference is made both to the ICFG 100 and the flowchart illustrating the method 200.

At step 202, an ICFG (e.g., the ICFG 100) of an application under test can be created. As noted, the ICFG 100 can comprise a plurality of nodes. Each of the plurality of nodes represents a respective portion of the application's program code, such as a module, a function, a routine, or the like. Further, ICFG 100 can be analyzed to identify program code milestones in the program code of the application, for example the portions of code L1-L4. At step 204, the program code of the application can be instrumented with instrumentation code configured to determine when the program code milestones are exercised during execution of the application. In illustration, the instrumentation code can be configured to identify each portion of the code L1-L4 to which an argument value of a test payload (e.g., a value assigned to a particular variable) is passed during execution of the application, and when such argument values are passed. The instrumentation also can capture various other data, such as argument values currently assigned to variables, the path through the ICFG 100 the argument variables are passed, etc.

At step 206, a user input specifying one or more properties for a test payload can be received. For example, the user can provide one or more predicates that describe the nature of the variables, argument values, etc. for the test payloads. In illustration, the predicates can define argument values that are tested by the code L2 to determine whether the variable representing the argument values should be passed to the code L3 or the code L4. For example, if the code L2 tests a numeric value to determine whether the numeric value satisfies a particular condition, the predicates can define that the argument value is a numeric value, and any comparison operators, for example "<", "<=", "=", ">=", ">" or the like. Moreover, the predicates can define that the argument value is an odd value, an even value, a prime number, a positive number, a negative number, etc. If the code L2 tests a string to determine whether the string satisfies a particular condition, the predicates can define that the argument value is a string, as well as any comparison operators that operate on the string.

At step 208, an initial hypothesis can be generated pertaining to the nature of test payloads that satisfy a specified property (or properties) and that are expected to satisfy a condition tested by the application's program code. In illustration, if the code L2 is being tested and tests whether "x>n" where x is a variable representing an input value and n is a value or another variable to which x is compared, this condition can be initialized to be "true." Thus, the hypothesis can specify properties of the variable "x" that are expected to satisfy the "true" condition. As noted, the present arrangements are not limited to numeric values, and can be applied to generate an initial hypothesis for testing any other suitable variables.

At step 210, a payload can be synthesized to test the hypothesis. Continuing with the above example, if the hypothesis assumes the value of "n" to be forty (40), a payload can be synthesized to have an argument value greater than forty for the variable "x". As used herein, to synthesize a test payload to test a hypothesis means to generate a test payload that assumes the hypothesis to be true or correct, and may be executed to generate results which may be analyzed to confirm whether the hypothesis is true or correct. For example, the hypothesis can hypothesize test constraints, and the test payloads can be synthesized to satisfy these constraints.

At step 212, the application can be executed using the argument value provided by the test payload. For example, the argument value can be provided to the code L1 at node 110 of FIG. 1. Since in this example, the code L1 is strait line code, the code L1 can pass the test payload to the code L1 at node 120. If the test payload satisfies the condition tested by the code L2, the test payload can be passed to code L3 at node 130. If not, the test payload can be passed to code L4 at node 140. The portions of the program code L1, L2, L3, L4 to which the payload is passed can be tracked and recorded. For instance, the argument value of the test payload and the respective portions of the code L1, L2, L3, L4 can be recorded to a data table, and the test payload can be associated with the respective portions of the code L1, L2, L3, L4 exercised during execution of the application. In other words, the test payload can be associated with each portion of the program code to which the test payload's argument value is passed during execution of the application.

At decision box 214, a determination can be made whether to synthesize an additional test payload to test the hypothesis. Such determination can be based on whether all possible argument values have been tested, some predefined analysis budget has been exhausted (e.g., a certain number of test payloads have been synthesized, all test values between 41 and 1000 have been tested, etc.), or the like. If a determination is made to synthesize an additional test payload, steps 210, 212 can repeat with the new test payload, and the process can continue until a determination is made at decision box 214 not to test additional payloads based on the current hypothesis.

Table 1 is an example of a table in which various test payloads, and the respective portions of the program code L1, L2, L3, L4 to which the test payloads are passed, are recorded and associated with one another. The data in Table 1 can be generated by the instrument code previously described.

TABLE 1

| Portion of Program Code | Test Payload Argument Values |
| --- | --- |
| L1 | {args [0] = 41, args [0] = 42} |
| L2 | {args [0] = 41, args [0] = 42} |
| L3 | {args [0] = 41, args [0] = 42} |
| L4 | { } |

In this example, two test payloads were synthesized and tested with the program code, one with an argument value of "41" and one with an argument value of "42". Each of these test payloads were passed to portions of the code L1, L2, L3, but were not passed to the portion of the code L4. Accordingly, Table 1 can present a list indicating associations between the payloads and the portions of the code L1-L2 to which the payloads are passed. Of course, numerous other test payloads can be synthesized and the present arrangements are not limited in this regard.

At decision box 216, a determination as to whether each of the test payloads satisfy the condition being tested, for example by performing an analysis based on which test payloads (e.g., argument values) are associated with respective portions of the program code L1, L2, L3, L4. For example, the analysis can identify portions of the program code L1, L2, L3, L4 to which respective variables are passed during various executions of the application. Moreover, the analysis can determine whether various test payloads flowing the application are partitioned. For example, the analysis can determine whether certain test payloads are passed from the portion of the program code L2 to the portion of the program code L3, and other test payloads are passed from the portion of the program code L2 to the portion of the program code L4.

If each of the test payloads does not satisfy the condition being tested (e.g., the test payloads are partitioned), at step 218 a new hypothesis can be generated based on an analysis of which argument values were passed to which nodes. For example, based on the partitioning of the test payloads, the manner in which the test payloads are partitioned can be analyzed to build additional descriptions of tests as classifiers. These classifiers can be used to hypothesize test constraints that may be responsible for the partitioning of the test payloads. For example, if certain test payloads pass from the portion of the code L2 to the portion of the code L3, and certain test payloads pass from the portion of the code L2 to the portion of the code L4, the test payloads can be analyzed to determine what is different between the test payloads passed to the respect portions of code L3 and L4. Based on this analysis, a constraint that is, or may be, responsible for the test payloads passing to the portion of code L3, which is not included in the previous hypothesis, can be hypothesized. Such constraint can be included in the new hypothesis.

Returning to step 210, new test payloads can be synthesized to test the new (e.g., revised) hypothesis and the process can continue as previously described. If, however, each of the test payloads does satisfy the condition being tested, the hypothesis can be considered to be sound, and at step 220 the process can end. The process also can end if a determination is made that full coverage has been accomplished, some predefined analysis budget has been exhausted, or all potential hypotheses have been explored.

Figure 3:
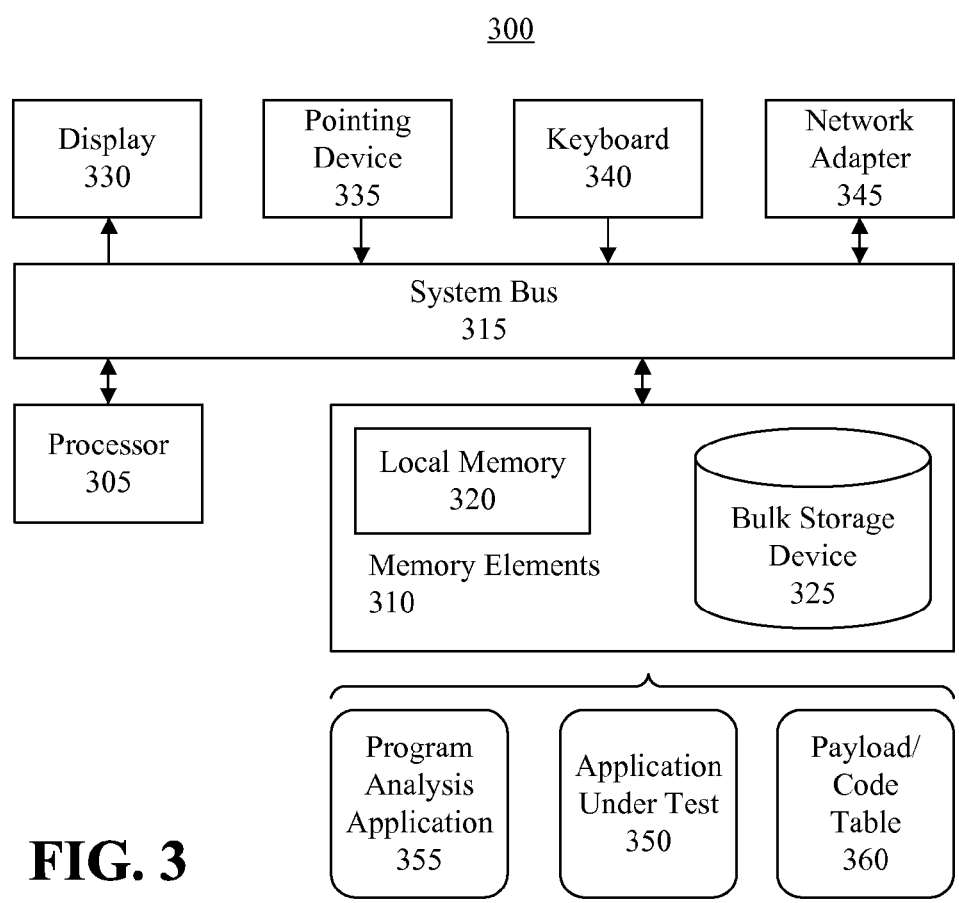
FIG. 3 depicts a block diagram of a system for performing dynamic concolic execution of an application in accordance with another embodiment disclosed within this specification.

FIG. 3 depicts a block diagram of a system 300 for performing dynamic concolic execution of an application in accordance with another embodiment disclosed within this specification. The system 300 can include at least one processor 305 (e.g., a central processing unit) coupled to memory elements 310 through a system bus 315 or other suitable circuitry. As such, the system 300 can store program code within the memory elements 310. The processor 305 can execute the program code accessed from the memory elements 310 via the system bus 315. It should be appreciated that the system 300 can be implemented in the form of any system including a processor and memory that is capable of performing the functions and/or operations described within this specification. For example, the system 300 can be implemented as a computer, a workstation, a mobile computer, a laptop computer, tablet computer, a smart phone, a personal digital assistant, a gaming device, an appliance, and so on.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The system 300 also can include one or more cache memories (not shown) that provide temporary storage of at least some program code in order to reduce the number of times program code must be retrieved from the bulk storage device 325 during execution.

Input/output (I/O) devices such as a display 330, a pointing device 335 and a keyboard 340 can be coupled to the system 300. The I/O devices can be coupled to the system 300 either directly or through intervening I/O controllers. For example, the display 330 can be coupled to the system 300 via a graphics processing unit (GPU), which may be a component of the processor 305 or a discrete device. One or more network adapters 345 also can be coupled to system 300 to enable system 300 to become coupled to other systems, computer systems, remote printers, and/or remote storage devices through intervening private or public networks. Modems, cable modems, and Ethernet cards are examples of different types of network adapters 345 that can be used with system 300.

As pictured in FIG. 3, the memory elements 310 can store a program analysis application 355 configured to perform the processes and methods described herein for performing dynamic concolic execution of an application. The memory elements 310 also can store the application under test 350, or the application under test 350 can be accessed from another device or system to which the system 300 is communicatively linked, for example via the network adapter 345. Being implemented in the form of executable program code, the program analysis application 355 can be executed by the system 300 and, as such, can be considered part of the system 300. Moreover, the program analysis application 355 is a functional data structure that imparts functionality when employed as part of the processing system of FIG. 3. The memory elements 310 further can store a table 360 that stores information related to various test payloads and the respective portions of the program code to which the test payloads are passed, for example as described herein with reference to Table 1.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
   a processor programmed to initiate executable operations comprising:
   generating a first hypotheses pertaining to a nature of test payloads that satisfy a specified property and that are expected to satisfy a condition tested by the application's program code;
   synthesizing a plurality of first test payloads to test the first hypothesis;
   submitting the plurality of first test payloads to the application during respective executions of the application, and during each execution of the application with at least one of the respective first test payloads, associating the respective first test payload with respective portions of the program code exercised during the execution of the application;
   determining whether each of the first test payloads actually satisfy the condition tested by the application's program code;
   when at least one of the first test payloads does not actually satisfy the condition tested by the application's program code:
   generating a second hypotheses that is expected to satisfy the condition tested by the application's program code;
   synthesizing a plurality of second test payloads to test the second hypothesis; and
   submitting the plurality of second test payloads to the application during respective executions of the application, and during each execution of the application with at least one of the respective second test payloads, associating the respective second test payload with respective portions of the program code exercised during the execution of the application.

2. The system of claim 1, wherein the processor further is programmed to execute operations comprising:
   outputting a list indicating associations of the first and second test payloads with respective portions of the program code.

3. The system of claim 1, wherein:
   determining whether each of the first test payloads actually satisfy the condition tested by the application's program code comprises analyzing associations of the first test payloads with respective portions of the program code.

4. The system of claim 3, wherein:
   generating the second hypotheses that is expected to satisfy the condition tested by the application's program code is based on an analysis of the associations of the first test payloads with respective portions of the program code.

5. The system of claim 1, wherein:
   generating the second hypotheses that is expected to satisfy the condition tested by the application's program code comprises hypothesizing a constraint for the test payloads, the constraint not present in the first hypothesis; and
   the processor further is programmed to execute operations comprising including the hypothesized constraint in the second hypothesis.

6. The system of claim 1, wherein synthesizing the plurality of first test payloads to test the first hypothesis comprises:
   receiving a user input specifying properties for the first test payloads; and
   synthesizing the plurality of first test payloads to conform to the specified properties.

7. The system of claim 1, wherein the processor further is programmed to execute operations comprising:
   instrumenting the application to determine when program code milestones are exercised during execution of the application.

8. The system of claim 7, wherein the processor further is programmed to execute operations comprising:
   creating a static representation of an inter-procedural control-flow graph of the application, the inter-procedural control-flow graph comprising a plurality of nodes, each of the plurality of nodes representing a respective portion of the application's program code; and
   analyzing the static representation of the inter-procedural control-flow graph to identify the program code milestones in the program code of the application.

9. A computer program product for dynamic concolic execution of an application, the computer program product comprising a computer readable storage medium having program code stored thereon, the program code executable by a processor to perform a method comprising:

generating, by the processor, a first hypotheses pertaining to a nature of test payloads that satisfy a specified property and that are expected to satisfy a condition tested by the application's program code;

synthesizing, by the processor, a plurality of first test payloads to test the first hypothesis;

submitting, by the processor, the plurality of first test payloads to the application during respective executions of the application, and during each execution of the application with at least one of the respective first test payloads, via the processor, associating the respective first test payload with respective portions of the program code exercised during the execution of the application;

determining, by the processor, whether each of the first test payloads actually satisfy the condition tested by the application's program code;

when at least one of the first test payloads does not actually satisfy the condition tested by the application's program code:

generating, by the processor, a second hypotheses that is expected to satisfy the condition tested by the application's program code;

synthesizing, by the processor, a plurality of first test payloads to test the first hypothesis; and submitting, by the processor, the plurality of second test payloads to the application during respective executions of the application, and during each execution of the application with at least one of the respective second test payloads, associating the respective second test payload with respective portions of the program code exercised during the execution of the application.

10. The computer program product of claim 9, the method further comprising:

outputting, via the processor, a list indicating associations of the first and second test payloads with respective portions of the program code.

11. The computer program product of claim 9, wherein:

determining whether each of the first test payloads actually satisfy the condition tested by the application's program code comprises analyzing associations of the first test payloads with respective portions of the program code.

12. The computer program product of claim 11, wherein:

generating the second hypotheses that is expected to satisfy the condition tested by the application's program code is based on an analysis of the associations of the first test payloads with respective portions of the program code.

13. The computer program product of claim 9, wherein:

generating the second hypotheses that is expected to satisfy the condition tested by the application's program code comprises hypothesizing a constraint for the test payloads, the constraint not present in the first hypothesis;

the method further comprising:

including, via the processor, the hypothesized constraint in the second hypothesis.

14. The computer program product of claim 9, wherein synthesizing the plurality of first test payloads to test the first hypothesis comprises:

receiving a user input specifying properties for the first test payloads; and synthesizing the plurality of first test payloads to conform to the specified properties.

15. The computer program product of claim 9, the method further comprising:

instrumenting, via the processor, the application to determine when program code milestones are exercised during execution of the application.

16. The computer program product of claim 15, the method further comprising:

creating, via the processor, a static representation of an inter-procedural control-flow graph of the application, the inter-procedural control-flow graph comprising a plurality of nodes, each of the plurality of nodes representing a respective portion of the application's program code; and analyzing, via the processor, the static representation of the inter-procedural control-flow graph to identify the program code milestones in the program code of the application.

\* \* \* \* \*